United States Patent [19]

Stinger

[11] 4,351,745
[45] Sep. 28, 1982

[54] ELECTRICALLY CONDUCTIVE POLYETHERESTER ELASTOMERS

[75] Inventor: Henry J. Stinger, Devon, Pa.

[73] Assignee: E. I. Du Pont de Nemours and Company, Wilmington, Del.

[21] Appl. No.: 110,775

[22] Filed: Jan. 9, 1980

[51] Int. Cl.$^3$ .............................................. H01B 1/06
[52] U.S. Cl. .................................... 252/511; 252/502; 428/244; 428/367; 428/408
[58] Field of Search ....................... 252/511, 500, 502; 260/40 R, 860; 528/300, 301; 428/902, 244, 327, 367, 408

[56] References Cited

U.S. PATENT DOCUMENTS

| | | | |
|---|---|---|---|
| 3,510,448 | 5/1970 | Byler et al. | 252/511 |
| 3,639,121 | 2/1972 | York | 260/40 R |
| 3,783,021 | 1/1974 | York | 252/511 |
| 4,035,265 | 7/1977 | Saunders | 252/511 |

OTHER PUBLICATIONS

"Hytmel ®", Polyester Elastomer, Du Pont Technical Data Sheet.

Primary Examiner—Joseph L. Schofer
Assistant Examiner—J. L. Barr

[57] ABSTRACT

Conductive elastomeric compositions consisting essentially of a blend of a copolyetherester having 45-85 weight percent of long chains and 15-55 weight percent of short chains and melting at at least 90° C. with a conductive filler consisting of carbon black or a mixture of carbon black with graphite, the resistivity of such compositions being less than about 2 ohm.cm can be fabricated or cast into thin, self-supporting films or sheets. Articles made from these compositions find utility in electrical and electronic equipment, business machines, and in applications where good aging properties are important.

10 Claims, No Drawings

ELECTRICALLY CONDUCTIVE POLYETHERESTER ELASTOMERS

BACKGROUND OF THE INVENTION

This invention relates to novel conductive elastomers having low electrical resistivity and very good physical properties.

Conductive elastomers are known to the art. They are made by compounding the elastomer with a conductive filler, for example, with graphite, carbon black, or powdered metal. A number of conductive elastomer types have been reported, including those based on polymers of chloroprene or of unsaturated hydrocarbon monomers, chlorosulfonated polyethylene, and fluoroelastomers. Some of these materials found use in moderate temperature heating elements, ignition wires, and conductive coatings. The best commercial materials had a rather high resistivity of about 6 ohm.cm. If the proportion of conductive filler was increased, the physical properties of the polymer deteriorated rapidly. Certain fluoroelastomers could be compounded to low-resistivity conductive materials, but their physical properties were quite poor. There was no known conductive elastomer that could be cast or fabricated into a very thin self-supporting film or tape for use in electronic equipment, especially where good strength, flexibility, and aging properties are important. Furthermore, it was necessary in preparing many prior art conductive elastomer compositions to observe a strict blending schedule because the conductivities of those compositions were dependent on the blending time. Once the highest conductivity composition was obtained, usually as soon as all the carbon was dispersed, further blending resulted in a conductivity decrease. Finally, many of those prior art conductive elastomers had poor aging characteristics.

It thus is highly desirable to provide an elastomeric composition having high conductivity, good physical properties, and good aging characteristics, capable of being cast or fabricated into very thin films, sheets, or tapes.

SUMMARY OF THE INVENTION

According to the present invention, there is provided an electrically conductive composition consisting essentially of a uniform mixture of:

(A) 100 parts of a copolyetherester having a melting point of at least about 90° C. and containing 45-85 weight percent of long-chain ester units represented by the following formula (1)

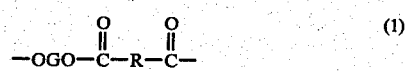

and 15-55 weight percent of short-chain ester units represented by the following formula (2)

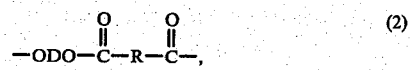

wherein

R is a divalent radical remaining after removal of carboxyl groups from an aromatic or aliphatic dicarboxylic acid having a molecular weight of less than 300;

G is a divalent radical remaining after the removal of terminal hydroxyl groups from a poly(alkylene oxide) glycol HO-G-OH having a number average molecular weight of about 600-3500 and a carbon/oxygen atomic ratio of at least 2.5; and D is a divalent radical remaining after removal of hydroxyl groups from a diol HO-D-OH having a molecular weight of less than about 250; and (B) 60-110 parts of a conductive filler selected from the group consisting of carbon black and a mixture of carbon black and graphite, the proportion of carbon black in such a mixture being no less than about 20 weight percent;

the resistivity of said electrically conductive composition being less than about 2 ohm.cm, its tensile strength at break at least about 10 MPa, and its extension at break at least 20%.

DETAILED DESCRIPTION OF THE INVENTION

The compositions of the present invention are based on copolyetheresters known to the art. Preferred copolyetheresters are commercially available from E. I. du Pont de Nemours and Company, Wilmington, Del. These preferred copolymers and various procedures for their preparation are described, among others, in the following U.S. Pat. Nos.: 3,023,192 to Shivers; 3,651,014 to Witsiepe; 3,766,146 to Witsiepe; and 3,932,326 to Hoh et al.; the disclosures of which are incorporated herein by reference.

The glycols HO-G-OH, from which the repeating long-chain ester units of formula (1) are derived, are polymeric glycols having terminal (or as nearly terminal as possible) hydroxyl groups. Representative glycols HO-G-OH include poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as ethylene oxide.

The diols HO-D-OH, from which the repeating short-chain ester units of formula (2) are derived, are monomeric, rather than polymeric, materials. The preferred diols contain 2-15 carbon atoms. Representative diols HO-D-OH include ethylene, propylene, tetramethylene, pentamethylene, 2,2-dimethyltrimethylene, hexamethylene, and decamethylene glycols, dihydroxycyclohexane, and cyclohexanedimethanol.

The term "diols HO-D-OH", as used herein, also includes equivalent ester-forming derivatives, for example diacetate esters, provided that the molecular weight limitation set forth herein applies to the diols only and not to such derivatives.

The term "dicarboxylic acids", as used herein, includes functional equivalents of dicarboxylic acids having two functional groups which perform substantially like dicarboxylic acids in reaction with glycols and diols in forming copolyetherester polymers. These equivalents include lower ester, acid halides, and acid anhydrides. The molecular weight requirement pertains to the acid and not to its functional equivalent.

Among the aromatic dicarboxylic acids for preparing the copolyetheresters of this invention, those with 8-16 carbon atoms are preferred, particularly the phenylenedicarboxylic acids, i.e., phthalic, terephthalic and isophthalic acids, and their dimethyl esters. Preferred aliphatic dicarboxylic acids include adipic acid and 1,4-cyclohexanedicarboxylic acid.

The preferred copolyetheresters of this invention are those prepared from dimethyl terephthalate, 1,4-butanediol, and poly(tetramethylene oxide) glycol having a number average molecular weight of about 600–2000. Optionally, up to about 45 mole percent of the dimethyl terephthalate in these polymers can be replaced by dimethyl phthalate or dimethyl isophthalate. Another preferred class of copolyetheresters is based on a polymeric glycol in which a poly(propylene oxide) center block is capped by poly(ethylene oxide) terminal blocks, the proportion of ethylene oxide units being about 15–25% by weight and the number average molecular weight of the glycol being 1500–2800.

The dicarboxylic acids or their derivatives and the polymeric glycol HO-G-OH are incorporated into the copolyetherester in the same molar proportions as are present in the reaction mixture. The amount of diol HO-D-OH actually incorporated corresponds to the difference between the moles of diacid and polymeric glycol present in the reaction mixture. When mixtures of low molecular weight diols HO-D-OH are employed, the amount of each diol incorporated is largely a function of the amount of the diols present, their boiling points, and relative reactivities. The total amount of diols HO-D-OH incorporated is still the difference between moles of diacid and polymeric glycol.

The copolyetheresters described herein are made by a conventional ester interchange reaction which preferably takes place in the presence of an antioxidant that is stable and substantially nonvolatile during the polymerization.

A preferred procedure involves heating dimethyl terephthalate with a long-chain glycol HO-G-OH and a molar excess of 1,4-butanediol in the presence of an antioxidant and a catalyst at about 150°–260° C. and a pressure of 0.05 to 0.4 MPa (preferably atmospheric pressure) while distilling off methanol formed by the ester interchange. Depending on the temperature, catalyst, proportion of glycol, and equipment, this reaction can be completed within a few minutes, e.g., about two minutes to a few hours, e.g., about two hours. In this first step, a low molecular weight prepolymer is formed. It can be carried to a high molecular weight copolyetherester by distillation of the excess of 1,4-butanediol in a second step, known as "polycondensation."

Additional ester interchange occurs during this polycondensation which serves to increase the molecular weight and to randomize the arrangement of the copolyetherester units. Best results are usually obtained if this final distillation or polycondensation is run at less than about 670 Pa, preferably less than about 250 Pa, and about 200°–280° C., preferably about 220°–260° C., for less than about two hours, e.g., about 0.5 to 1.5 hours.

Although the antioxidant can be introduced at any stage of copolyetherester formation or after the polymer is prepared, it is preferable that the antioxidant be added with the monomers, as indicated above. While a wide variety of catalysts can be employed, organic titanates such as tetrabutyl titanate, used alone or in combination with magnesium or calcium acetates, are preferred. The catalyst should be present in the amount of about 0.005 to 2.0 percent by weight based on total reactants. Both batch and continuous methods can be used for any stage of copolyetherester polymer preparation.

The electrically conductive elastomeric compositions of the present invention are prepared by compounding the polyetherester with the conductive filler. Most commercial conductive carbon blacks are suitable for this application. The preferred carbon blacks have a surface area of more than 30 m$^2$/g, as determined by nitrogen absorption; a particle size of less than 70 μm, determined by electron microscopy; and dibutyl phthalate absorption value of more than 50 cm$^3$ per 100 g. Suitable carbon blacks include, among others, acetylene blacks, intermediate super abrasion furnace blacks (ISAF blacks), conductive furnace blacks (CF blacks), conducting channel blacks (CC blacks), and fine thermal blacks (FT blacks). Graphite, although generally known as a conductive allotropic form of carbon, cannot be used by itself. In fact, proportions of graphite above 80% by weight of a mixture with carbon black have undesirably high resistivity. A suitable form of graphite is a crystalline grain type, for example Ceylon-Dixon 200-10 having an average particle size of less than 2.5 μm. The advantage of having graphite in these compositions lies in good lubricating properties of graphite, so that processing of these compositions is quite easy. Also, the thoroughness and homogeneity of mixing are better in the presence of graphite. Since no significant loss of conductivity occurs in the presence of the stated proportions of graphite, such compositions are one of the preferred embodiments of the present invention. Such compositions can be readily extruded and injection-molded and have good flow properties in the fabricating equipment.

The electrically conductive compositions of the present invention can be prepared by either dry or wet compounding. Dry blending can be accomplished in any suitable equipment such as, for example, a Banbury blender, a two-roll rubber mill, or a screw mixer. It is necessary to maintain the temperature at least slightly above the copolymer melting point. Usually, the copolymer is introduced into the blending equipment first, and the conductive filler is added as the molten copolymer accepts it. The temperature should be controlled to avoid copolymer degradation. When a screw mixer is used, it is possible to obtain a good dispersion of the conductive filler in the copolymer even when starting with a dry blend of these two components; however, two passes usually are required for a homogeneous mixture. If the conductive filler is added after the polymer has softened, one pass is adequate.

It is practical to blend the copolymer with the conductive filler in the presence of a plasticizer. Suitable plasticizers include, among others, chlorinated paraffin, dioctyl phthalate, butyl phthalyl butyl glycolate, N-ethyl o- and p-toluenesulfonamide, 2-ethylhexyl diphenyl phosphate, polymeric polyester plasticizers, and substantially noncrystalline or low-melting copolyetheresters similar in structure to those contemplated by the present invention. Such copolyetheresters are described in U.S. Pat. No. 3,917,743 to Schroeder et al. When a plasticizer is used, it is practical to premix it with the conductive carbon black and then blend this premix with the copolyetherester. When a screw mixer is used, the plasticizer conveniently is added as the last ingredient. The plasticizers, when present in the blends, are good processing aids which reduce the melting point of the polymer, reduce the melting viscosity, may improve the polymer heat resistance, increase the flexibility of articles fabricated from the copolymer and the elasticity (elongation at break) of the composition.

Unlike the prior art conductive elastomer compositions, the conductivity of the copolyetheresters of the present invention is not sensitive to prolonged blending.

Wet dispersions can be prepared by conventional blending techniques, using equipment such as paint mixers, ball mills, attritors, or three-roll ink mills. The dispersing medium usually is a low-boiling chlorinated hydrocarbon such as, for example, methylene chloride mixed with a minor amount of 1,1,1-trichloroethane. The proportion of solids in such dispersions usually is 5-25 weight percent, preferably 10-15 weight percent. Depending on the equipment used, good dispersion can be obtained in less than 30 minutes to about one hour. However, a ball mill and an ink mill require long blending periods, up to about 12 hours. Another way of preparing a wet dispersion is to pelletize a dry mix and dissolve the copolymer in a solvent. The conductive filler remains dispersed in the solvent.

The wet dispersions are very useful for casting very thin films of conductive copolyetherester. Those films have excellent mechanical strength, are self-supporting, and can be used in many specialized applications, especially in electronic equipment, business machines, and such.

The conductive copolyetheresters of the present invention are unique in that they combine excellent electrical properties, that is, high conductivity or low resistivity, with very good physical properties. Furthermore, contrary to the conductive elastomers of the prior art, they require no curing. They can thus be fabricated, cast into films, and processed easily and simply at a saving of time, energy, and equipment. These compositions have good aging resistance and can be used in applications where this property is important, for example in ignition cables.

This invention is now illustrated by the following examples of certain representative embodiments thereof, where all proportions, parts, and percentages are by weight unless otherwise indicated.

Resistivity measurements are made using the potentiometric method (Kelvin bridge). This method is described in *Conductive Rubbers and Plastics*, R. H. Norman, Elsevier Publishing Co., Ltd., 1970, pp. 183-185. A test piece in the form of a strip having a width of 1 cm and a thickness of about 0.1 cm is used. The current electrodes are place 9 cm apart and a series of readings are taken with the potential electrodes separated by distances of 7, 5, 3 and 1 cm. The average of resistances calculated for the different separations is reported.

Stress-strain measurements are carried out in accordance with ASTM D412.

Copolyetherester A is prepared by ester interchange and polycondensation of dimethyl terephthalate (DMT), dimethyl isophthalate (DMI), poly(tetramethylene oxide) glycol having a number average molecular weight of 2100 (PTMEG-2100) and excess 1,4-butanediol (BDO). The polymer is the reaction product of 3.325 moles DMT, 1.425 moles DMI, 3.75 moles BDO and 1.00 mole PTMEG-2100. The polymer contains 27.0% short chain ester units. It has a melt index of 6 g/10 min. at 190° C./2160 g. (ASTM D-1238).

Copolyetherester B is prepared by ester interchange and polycondensation of DMT, DMI, poly(tetramethylene oxide) glycol having a number average molecular weight of 1000 (PTMEG-1000) and excess BDO. The polymer is the reaction product of 4.84 moles of DMT, 1.41 moles DMI, 5.25 moles of BDO and 1 mole of PTMEG-1000. The polymer contains 50.6% short chain ester units and has a melt index of 7 g/10 min. at 200° C./2160 g.

Copolyetherester C is prepared by ester interchange and polycondensation of DMT, PTMEG-1000, excess BDO and a minor amount of trimellitic anhydride. The polymer is the reaction product of 4.0 moles DMT, 3.0 moles BDO, 1.0 mole of PTMEG-1000 and 0.0187 mole of trimellitic anhydride. The polymer contains about 37% short chain ester units and has a melt index of 6.2 g/10 min. at 200° C./2160 g.

EXAMPLE 1

Copolyetherester B is mixed at 180° C. with the amounts of carbon black shown in Table I. The compositions are prepared on either a two-roll mill or in a Banbury mixer as shown in the table. In either type of equipment, the copolyester is first heated to about 180° C. to soften the polymer and black is then added as rapidly as the polymer will accept it. Once all the carbon has been added, mixing is continued for about 5 min. The composition is then removed from the mixing equipment and compression molded at 180° C. to form slabs for resistivity measurements and determination of physical properties.

TABLE I

| | A | B | C | D | E | F | G | H |
|---|---|---|---|---|---|---|---|---|
| Copolyetherester B, parts | 100 | 100 | 100 | 100 | 100 | 100 | 100 | 100 |
| Cabot XC-72, parts | 100 | — | — | — | — | — | — | — |
| SAF black, parts | — | 100 | — | — | — | — | — | — |
| HAF black, parts | — | — | 100 | — | — | — | — | — |
| ISAF black, parts | — | — | — | 100 | — | — | — | — |
| Acetylene black, parts | — | — | — | — | 100 | — | — | — |
| Cabot SC black, parts | — | — | — | — | — | 100 | — | — |
| Cabot XC-72 black, parts | — | — | — | — | — | — | 90 | — |
| ISAF black, parts | — | — | — | — | — | — | — | 85 |
| Resistivity, ohm · cm | 0.35 | 0.8 | 0.7 | 0.65 | 0.85 | 0.65 | 0.35 | 0.85 |
| Method of mixing | Mill | Mill | Mill | Mill | Mill | Mill | Banbury | Banbury |

Compositions A through H exhibit tensile strengths in excess of 10 MPa and elongations at break in excess of 20%.

EXAMPLE 2

A series of four conductive compositions are prepared by milling Cabot XC-72 carbon black with Copolyetherester A and Copolyetherester B in the amounts shown in Table II. The milling procedure is that described in Example 1. The compositions are compression molded to form slabs for measurements of resistivity and physical properties. The results are given below.

TABLE II

| | 2-A | 2-B | 2-C | 2-D |
|---|---|---|---|---|
| Copolyetherester A, parts | 100 | 100 | 10 | 20 |
| Copolyetherester B, parts | — | — | 90 | 80 |
| Carbon black, parts | 80 | 100 | 100 | 100 |
| Resistivity, ohm · cm | 0.78 | 0.35 | 0.26 | 0.33 |
| Tensile strength at break, MPa | 12.6 | 10.9 | 22.8 | 15.5 |

TABLE II-continued

|  | 2-A | 2-B | 2-C | 2-D |
|---|---|---|---|---|
| Elongation at break, % | 245 | 170 | 40 | 25 |

In preparing compositions 2-C and 2-D, Copolyetherester B is first softened on the hot mill and blended with Copolyetherester A. Carbon black is then added.

Compositions 2-A through 2-D all exhibit very low resistivity and good physical properties. By varying the copolyetherester blends, a wide range of elongations are available.

EXAMPLE 3

A series of conductive compositions are prepared by milling carbon black and graphite with Copolyetherester B in the proportions shown in Table III. The graphite used is Dixon Air Spun No. 200-10 supplied by Dixon Crucible Co., Jersey City, NJ. This grade of graphite is described as crystalline Ceylon graphite having a carbon content of 98% and a particle size of 2.5 microns. The milling is performed substantially by the procedure of Example 1. The carbon black is incorporated in the copolyetherester before graphite is added. The compositions are compression molded to form sheets for determination of resistivity and physical properties.

TABLE III

|  | 3-A | 3-B | 3-C | 3-D | 3-E | 3-F |
|---|---|---|---|---|---|---|
| Copolyetherester B, parts | 100 | 100 | 100 | 100 | 100 | 100 |
| Cabot XC-72, parts | 90 | 70 | 40 | 50 | — | — |
| ISAF black, parts | — | — | — | — | 90 | 50 |
| Graphite, parts | 10 | 30 | 40 | 50 | 10 | 50 |
| Resistivity, ohm cm | 0.25 | 0.2 | 0.72 | 0.4 | 0.45 | 0.68 |
| Tensile strength at break, MPa | 23.8 | 20.7 | 25.9 | 27.0 | 24.3 | 27.7 |
| Elongation at break, % | 30 | 20 | 40 | 20 | 30 | 30 |

The table shows that low resistivities can be obtained using graphite in admixture with carbon blacks.

EXAMPLE 4

Conductive compositions are prepared from Copolyetherester C and the conductive fillers shown in Table IV. The compositions are mixed by the procedure of Example 1. Properties are determined on sheets formed by compression molding.

TABLE IV

|  | 4-A | 4-B | 4-C |
|---|---|---|---|
| Copolyetherester C, parts | 100 | 100 | 100 |
| Cabot XC-72, parts | 100 | — | 50 |
| ISAF black, parts | — | 100 | — |
| Graphite, parts | — | — | 50 |
| Resistivity, ohm · cm | 0.30 | 0.45 | 0.26 |
| Tensile strength at break, MPa | 24.8 | 26.7 | 22.1 |
| Elongation at break, % | 25 | 20 | 20 |

As can be seen, compositions having very low resistivities are obtained either in the absence or in the presence of graphite.

EXAMPLE 5

Two cast films are prepared from Copolyetherester B and either Cabot SC black or acetylene black. Dispersions of 25 g of solids (polymer plus carbon) in about 250 g of methylene chloride are prepared by ball-milling the ingredients for 16 hours. Thin films are formed by coating and drying. Properties of the films are shown in Table V.

TABLE V

|  | 5-A | 5-B |
|---|---|---|
| Copolyetherester B, parts | 100 | 100 |
| Acetylene black, parts | 100 | — |
| Cabot SC black, parts | — | 100 |
| Resistivity, ohm · cm | 1.55 | 0.81 |
| Tensile strength at break, MPa | 20.7 | 20.4 |
| Elongation at break, % | 30 | 80 |
| Thickness, cm | 0.0015 | 0.003 |

EXAMPLE 6

A series of conductive compositions containing plasticizers are prepared from the formulations shown in Table VI. The procedure of Example 1 is employed with the exception that the plasticizer is mixed with the carbon black prior to adding the black to the heated polymer. Following milling, the compositions are formed by compression molding into sheets, which are used for measurements of resistivity and physical properties. Results are shown in Table VI.

TABLE VI

|  | 6-A | 6-B | 6-C |
|---|---|---|---|
| Copolyetherester B, parts | 100 | 100 | 100 |
| Carbon black, parts | 100 | 100 | 100 |
| Plasticizer A[a], parts | 30 | — | — |
| Plasticizer B[b], parts | — | 30 | — |
| Plasticizer C[c], parts | — | — | 30 |
| Resistivity, ohm · cm | 0.75 | 0.78 | 0.58 |
| Tensile strength at break, MPa | 14.5 | 15.2 | 15.5 |
| Elongation at break, % | 100 | 135 | 90 |

[a] N—ethyl o- and p-toluenesulfonamide, sold as "Santicizer" 8 by Monsanto, Akron, Ohio.
[b] Polymeric polyester type sold as "Santicizer" 409 by Monsanto, Akron, Ohio, sp. gr. 1.080–1.084, flash point 530° C.
[c] Medium molecular wt. polymeric ester type sold as "Hatcol" 630 by W. R. Grace, Lexington, Massachusetts, sp. gr. 1.060, flash point 254° C., viscosity at 20° C., 5 Pa · s.

I claim:

1. An electrically conductive composition, capable of forming self-supporting films, consisting essentially of a uniform mixture of:

(A) 100 parts of a copolyetherester having a melting point of at least about 90° C. and containing 45–85 weight percent of long-chain ester units represented by the following formula (1)

$$-\text{OGO}-\overset{\text{O}}{\underset{\|}{\text{C}}}-\text{R}-\overset{\text{O}}{\underset{\|}{\text{C}}}- \quad (1)$$

and 15–55 weight percent of short-chain ester units represented by the following formula (2)

$$-\text{ODO}-\overset{\text{O}}{\underset{\|}{\text{C}}}-\text{R}-\overset{\text{O}}{\underset{\|}{\text{C}}}- \quad (2)$$

wherein

R is a divalent radical remaining after removal of carboxyl groups from an aromatic or aliphatic dicarboxylic acid having a molecular weight of less than 300;

G is a divalent radical remaining after the removal of terminal hydroxyl groups from a poly(alkylene oxide) glycol HO-G-OH having a number average molecular weight of about 600–3500 and a carbon/oxygen atomic ratio of at least 2.5; and D is a divalent radical remaining after removal of hydroxyl groups from a diol HO-D-OH having a molecular weight of less than about 250; and (B) 60-110 parts of a conductive filler selected from the group consisting of carbon black and a mixture of carbon black and graphite, the proportion of carbon black in such a mixture being no less than about 20 weight percent;

the resistivity of said electrically conductive composition being less than about 2 ohm.cm, its tensile strength at break at least about 10 MPa, and its extension at break at least 20%.

2. A compostion of claim 1 wherein the polymeric glycol HO-G-OH is selected from the group consisting of poly(tetramethylene oxide) glycol, random copolymers of ethylene oxide and 1,2-propylene oxide, block copolymers of ethylene oxide and 1,2-propylene oxide, and copolymers of tetrahydrofuran with ethylene oxide.

3. A composition of claim 2 wherein the diol HO-D-OH is 1,4-butanediol.

4. A composition of claim 1 wherein R is selected from the group 1,2-phenylene, 1,3-phenylene, and 1,4-phenylene.

5. A composition of claim 1 wherein the conductive filler is a carbon black having a surface area of more than 30 $m^2/g$, as determined by nitrogen absorption; a particle size of less than 70 $\mu m$, determined by electron microscopy; and dibutyl phthalate absorption value of more than 50 $cm^3$ per 100 g.

6. A composition of claim 1 also containing a plasticizer.

7. Composition of claim 6 wherein the plasticizer is selected from the group consisting of: chlorinated paraffin, dioctyl phthalate, butyl stearyl butyl glycolate, N-ethyl o- and p-toluenesulfonamide, 2-ethylhexyl diphenyl phosphate, polymeric polyester plasticizers, and substantially noncrystalline or low melting copolyetheresters.

8. A composition of claim 7 wherein the plasticizer is a low-melting copolyetherester of a chemical structure similar to the copolyetheresters of formulas (1) and (2).

9. A dispersion of a conductive composition of claim 1 in an organic solvent.

10. A conductive film or sheet cast from a wet dispersion of claim 9.

* * * * *